455-615 AU 233 EX
FIP8106 XR 3,175,088

March 23, 1965 D. R. HERRIOTT 3,175,088

OPTICAL FREQUENCY MODULATION AND HETERODYNE RECOVERY SYSTEM

Filed June 22, 1961 3 Sheets-Sheet 1

INVENTOR
D. R. HERRIOTT
BY Harry C. Hart
ATTORNEY

March 23, 1965 D. R. HERRIOTT 3,175,088

OPTICAL FREQUENCY MODULATION AND HETERODYNE RECOVERY SYSTEM

Filed June 22, 1961 3 Sheets-Sheet 2

INVENTOR
D. R. HERRIOTT
BY Harry C. Hart
ATTORNEY

OPTICAL FREQUENCY MODULATION AND HETERODYNE RECOVERY SYSTEM

Filed June 22, 1961 3 Sheets-Sheet 3

INVENTOR
D. R. HERRIOTT
BY Harry C. Hart
ATTORNEY

United States Patent Office 3,175,088
Patented Mar. 23, 1965

3,175,088

OPTICAL FREQUENCY MODULATION AND HETERODYNE RECOVERY SYSTEM

Donald R. Herriott, Morris Township, Morris County, N.J., assignor to Bell Telephone Laboratories, Incorporated, New York, N.Y., a corporation of New York Filed June 22, 1961, Ser. No. 118,998
17 Claims. (Cl. 250—199)

This invention is concerned with the transmission of messages by modulated light beams. It has for its principal object the improvement of the signal-to-noise ratio of such a system.

It is well known that a message may be imposed on a beam of light by "chopping" it or otherwise modulating its amplitude, and that the message may be recovered from the beam as thus modulated through the use of a conventional photoelectric cell or a photomultiplier. One of the more common light valves to serve as a modulator consists of a conventional Kerr cell preceded by a polarizer, whose transmission axis is oriented at 45° to the axes of birefringence of the Kerr cell, and followed by an analyzer. With such a system, the recovered message is always degraded, to some extent, by "noise," either acquired by the beam in the course of transmission or originating in fluctuations of the intensity or the wavelength of the source light itself, or both.

In the technology of radio communication it has been established that the imposition of a message wave on a carrier by modulating the frequency of the carrier, in contrast to its amplitude, permits a marked improvement in the ratio of the recovered signal to the recovered noise and, consequently, a marked reduction in the degradation of the message by noise. This improvement is especially realized with "wide swing" frequency modulation. When the technique of frequency modulation is employed, the message can be recovered from the modulated radio wave only by the use of a "slope" circuit or some equivalent unit that converts variations of frequency or of phase of the carrier into variations of amplitude and delivers the latter at its output terminals in a form suitable for application to a reproducer. Circuits and units of this kind are generally known as discriminators. Certain of them are described in F. E. Terman's "Radio Engineers' Handbook," Sec. 7, par. 18. The improvement in signal-to-noise ratio attainable by frequency modulation is described in the same handbook, Sec. 9, par. 10.

In the optical wavelength range, in which the frequencies of vibration are many times higher than radio frequencies, no unit or component whose operation parallels that of the radio frequency discriminator is available. Consequently, it has in the past been impossible to recover a message imposed on a light beam by modulation of its frequency, and light beam communication has been restricted to the technique of amplitude modulation with the unfavorable signal-to-noise ratios that accompany it.

The present invention escapes from this dilemma by the use of an auxiliary unmodulated light beam of a frequency that differs by a preassigned fixed amount from the mean frequency of the principal modulated beam, but is otherwise completely coherent with the principal beam before modulation of the latter. To assure such coherence, the auxiliary beam is derived from the same light source as is the principal beam, i.e., by splitting the original beam into two component beams, so that every fluctuation in the amplitude or in the frequency of the principal beam is exactly duplicated in the auxiliary beam. The auxiliary beam is now shifted in frequency by a fixed amount, while the frequency of the principal beam is modulated by a message wave. The two beams, one modulated and the other shifted in frequency, are now brought together at a common point, preferably after traveling along paths of identical lengths. At this common point, the two component beams are combined as a composite beam, and the composite beam is radiated toward the receiver station.

At the receiver station, a modulation product of the two components of the composite beam is developed through the use of a nonlinear element or elements which deliver an output whose instantaneous frequency is the difference between the instantaneous frequencies of the two beam components. Because of the frequency shift of the auxiliary beam, the mean frequency of the output is equal to the amount of the shift, while its frequency variations are only those of the modulating signal. In this fashion, all fluctuations of intensity and of frequency of the original light source itself and nearly all of the fluctuations that the composite beam may have gathered in the course of transmission are nullified in the output of the nonlinear device.

The magnitude of the frequency shift of the auxiliary beam is advantageously chosen so that the mean frequency of the useful modulation product, now an electrical, in contrast to an optical, wave, shall lie in a convenient frequency range for which slope circuits or other frequency discriminators are available. In any event, it should be substantially greater than the highest frequency component of the message wave. The useful modulation product, itself bearing message-determined frequency variations, is applied to such a discriminator which converts its frequency variations into amplitude variations, i.e., into a replica of the original message wave which may now be applied to a reproducer. For reasons well known in the art of radio communication, an amplitude limiter is advantageously introduced between the nonlinear element and the discriminator.

The frequency modulation and the frequency shift may be introduced into the principal beam and the auxiliary beam, respectively, in various ways. One way, which turns the Doppler effect to account, is to vary the path length of the light beam between the original source and the combining point. This may readily be done with a mirror that is caused to move in a direction substantially perpendicular to the direction of the component beam, in proportion to the message wave variations in the one case and, in the other case, at a substantially constant speed in excess of the highest speed attained by the modulating mirror. Another way, that turns the Kerr effect to account, utilizes the phenomenon of controllable birefringence in a Kerr cell, variously modified to produce frequency modulation or frequency shift as required. In particular, a conventional Kerr cell, preceded by a polarizer whose polarization axis is oriented parallel with the vibration axis of the extraordinary ray in the Kerr cell, and without the analyzer that follows it in the case of the conventional light valve, provides frequency modulation of a light beam passing through it in conformity with a message wave applied to its actuating electrodes.

In accordance with a specific aspect of the invention, a continuously increasing phase shift is introduced into the auxiliary beam through a further modification of the conventional Kerr cell, in that it is actuated by an electrostatic field that rotates uniformly in a plane normal to the path of the light beam passing through it, while remaining of constant strength. This rotary energization of the Kerr cell may be secured by equipping the cell with four electrodes symmetrically disposed around it and by energizing these electrodes in time-quadrature with voltages derived from an auxiliary source. In consequence, the plane of polarization for the extraordinary ray through the cell revolves at the frequency of the auxiliary source. The length of the Kerr cell and the strength of the revolving field are so coordinated as to introduce a half wavelength difference between the retardation of the ordinary ray and that of the extraordinary ray.

This modified Kerr cell is supplied with circularly polarized light as developed, for example, by a conventional polarizer and a conventional quarter wave plate. The action of the cell, with its rotating polarization plane, is to convert the incident circularly polarized light into emergent light which, again, is circularly polarized but its plane of polarization revolves (*a*) in the sense opposite to that of the incident light and (*b*) at a rate that differs from that of the incident beam by twice the frequency of the auxiliary source. This emergent beam is now applied to a second retardation plate, of a thickness proportioned to introduce differential retardation of one-quarter wavelength between the ordinary ray and the extraordinary ray. It thus operates to convert the circularly polarized light emerging from the modified Kerr cell into plane polarized light in which, however, the frequency shift introduced by the cell is preserved. The action of the entire combination of elements is thus to introduce, into the light beam passing through it, a phase shift that increases, or decreases, continuously and steadily at a rate equal to twice the frequency of oscillation of the auxiliary source, and hence to shift the frequency of the beam passing through it by the same amount.

At the receiver station, intermodulation of the two component beams gives rise to a complex wave of which only the lower order cross product component is useful. Insofar as the other components reach the output terminals at all they make only for distortion or noise or both. In accordance with a further feature of the invention, therefore, these undesired modulation products are eliminated, for the most part, at the start. This is done in the following fashion.

Because of the difference between the mean frequencies of the two component beams, the composite beam is characterized by an axial interference pattern. That is to say, at certain points along the path of the composite beam the electric vectors of the two components are in phase coincidence, making for an additive relation, while at intermediate points they are in phase opposition, making for a subtractive relation. Hence, a receptor located where the relation is additive receives the sum of the two components while another receptor, located where the relation is subtractive, receives their difference. It is well known that the product of two factors is equal, aside from a constant multiplier, to the square of the sum of the components reduced by the square of their difference. The input-output characteristic of a conventional photomultiplier closely follows a square law. Hence, the output of a photomultiplier located at an additive point of the beam path is proportional to the square of the sum of the components while the output of another photomultiplier located at a subtractive point of the composite beam is proportional to the square of their difference. These several photomultiplier outputs are now applied to a subtractor and the output of the subtractor is proportional to the desired product, unburdened by undesired cross product terms. This output, in turn, comprises only two terms, of which the desired one is of a mean frequency equal to the shift and carries the modulating signal, while the undesired one is of a frequency substantially double that of the original light source and hence unrecognizable.

Within the transmission apparatus, any desired combination of frequency modulator for the principal beam and frequency shifter for the auxiliary beam may be employed. Moreover, whatever the character of the transmitter apparatus, the receiver may comprise a component modulator as first described above or, if preferred, it may be of the "quarter square" multiplier type last described above.

The invention will be fully apprehended from the following detailed description of illustrative embodiments thereof taken in connection with the appended drawings in which.

Figure 1:
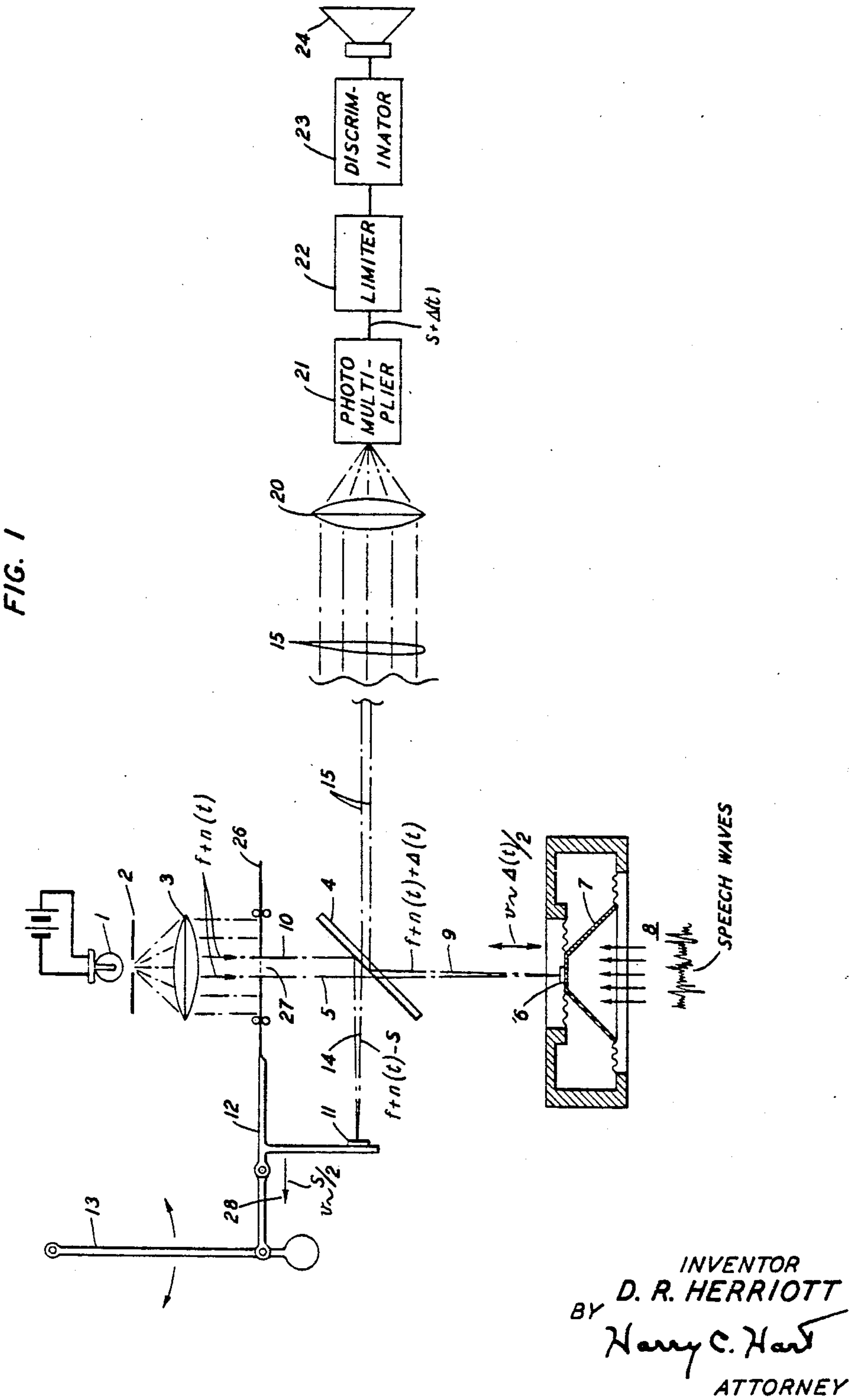
FIG. 1 is a schematic energy path diagram showing a system embodying the invention.

Referring now to FIG. 1, light rays originating in a source such as an incandescent lamp 1 pass through a collimator comprising a shield 2, pierced by a pinhole, and a lens 3. The light rays brought into parallelism by the collimator are split by a semitransparent mirror 4 into two beams of like intensities and equal lengths. The principal beam 5 extends through the semitransparent mirror 4 to a wholly reflecting mirror 6 that is arranged to be moved parallel with the beam axis in accordance with a message wave and to reflect the beam back to the semitransparent mirror 4 as a recombining element. Illustratively, the mirror 6 is mounted on a diaphragm 7 that is vibrated by incident speech waves 8. Movement of the diaphragm 7 with its mirror 6 through an axial distance toward or away from the source 1 thus shortens or lengthens the path of the incident ray 5 and also the path of the reflected ray 9 and hence, by virtue of the Doppler effect, advances or retards the phase of the reflected ray 9 by twice the amount of the advance or retreat of the mirror 6. The integral of any such message-controlled phase variation is a message wave-determined modulation of the frequency of the reflected ray 9.

The auxiliary ray 10 is reflected by the semitransparent mirror 4 and directed onto a wholly reflecting mirror 11 that is arranged for axial movement at a substantially constant speed, either toward the light source 1 or away from it. For example, this mirror 11 may be mounted on a reciprocating arm 12 linked to a pendulum 13 that may be driven by a conventional clock escapement mechanism, not shown, so that it swings toward the semitransparent mirror 4 and away from it in turn. Like the mirror 6 mounted on the diaphragm, the pendulum-driven mirror 11 modifies the path lengths of the incident and reflected auxiliary rays 10, 14 and hence, by virtue of the Doppler effect, introduces into the reflected ray 14 an advance or a retardation of its phase by twice the amount of the advance or retreat of the mirror 11. The integral of any such constant speed phase variation is a frequency shift.

The reflected principal ray 9 is now reflected by the semitransparent mirror 4 while the reflected auxiliary ray 14 passes through the semitransparent mirror 4, and the two rays are thus recombined as a composite beam 15 by the semitransparent mirror 4 for radiation toward a receiver station.

It is well known that the wavelength, and hence the frequency, of the light from an incandescent source depends on its temperature so that small variations of temperature make for variations of its frequency. Such frequency variations, about a mean frequency $f$, taken as fixed, are common to the principal and auxiliary rays 5, 10 and are denoted $n(t)$. Hence, the instantaneous frequencies of the beams incident on the diaphragm-driven mirror 6 and on the pendulum-driven mirror 11 are alike, being equal in each case to $$f+n(t) \tag{1}$$

The message wave-determined modulations imposed on this frequency by the movements of the diaphragm-driven mirror 6 may be denoted $\Delta(t)$, so that the resulting frequency of the reflected principal beam 9 can be designated $$f+n(t)+\Delta(t) \quad (2)$$

Similarly, the frequency shift imposed on the auxiliary beam 10 by the movements of the pendulum-driven mirror 11 at a constant speed may be denoted $s$. Hence, for that part of the pendulum cycle during which the pendulum 13 is moving away from the source 1, the instantaneous frequency of the reflected auxiliary beam 14 may be denoted $$f+n(t)-s \quad (3)$$

The composite beam 15, after radiation to a receiver station, is directed, as by a lens 20, onto a device having a nonlinear input-output characteristic such as to intermodulate the two components 9, 14 of the composite beam 15. This device may be a conventional photomultiplier 21 which is well known to have a square law characteristic.

When the components whose frequencies are given by Equations 2 and 3, respectively, are intermodulated by this device, many modulation products are formed; in particular, output components whose frequencies are the sum and the difference, respectively, of the frequencies of the two incident component beams. The sum frequency is given by $$2f+2n(t)+\Delta(t)-s \quad (4)$$

i.e., it is of the order of twice the frequency of the light of the original source 1 and hence much too high to pass the output circuit of the photomultiplier 21. The difference frequency, to the contrary, is $$s+\Delta(t) \quad (5)$$

in which the shift $s$ plays the part of an intermediate frequency subcarrier, and from which the noise component, $n(t)$, has vanished. Moreover, by appropriate choice of the magnitude of the frequncy shift $s$, the difference frequency component of Equation 5 may be brought into any desired frequency range. In particular, it may be brought into a frequency range for which a frequency-to-amplitude converter, generally known as a discriminator, is available.

The light of the original source 1 may contain sporadic variations of intensity, as well as of its frequency. Such variations, along with incidental variations in the amplitudes of the principal and auxiliary component beams which may appear in the output circuit of the photomultiplier 21 may conveniently be removed by the interposition of a limiter 22 which thus purifies the signal applied to the discriminator 23 so that its variations are only frequency variations and only those due to movement of the diaphragm 7 and hence to the incident speech waves 8. The discriminator 23 converts these frequency variations into amplitude variations which reproduce the pressure variations of the speech waves 8 themselves. The varying amplitude wave is now applied to a reproducer 24 which recovers the speech message wave in audible form.

In order that the signal applied to the discriminator 23 shall be of a frequency that varies, with the modulation $\Delta$, above and below the mean frequency $s$ but never passes through zero, the frequency shift $s$, introduced by the pendulum-driven mirror 11, should be higher than the highest component frequency of the message that it is desired to reproduce. Message waves of all kinds are normally band-limited so that the highest component frequency of a message wave can be specified. For example, it is usual to treat the frequency band occupied by a speech wave as extending from 100 cycles per second to 4,000 cycles per second, the upper band-limit being thus 4 kilocycles per second. With this restriction, the magnitude of the frequency shift $s$ may conveniently lie in the range 10 kc.–100 kc.

The instantaneous velocity of the pendulum-driven mirror 11 varies sinusoidally with the time. With an appropriate choice of the length of the pendulum 13 and of the amplitude of its swing, the frequency shift which it introduces while its velocity is highest, namely, at the midpoint of each swing, can readily have a magnitude of 10–100 kc. Restriction of the duty cycle of the pendulum to 5 or 10% of its total swing introduces a nearly constant frequency shift of the auxiliary beam of the required magnitude. The restriction can be secured by a beam chopper or light valve interposed in the path of the original light, or in that of the composite radiated beam, as preferred. This chopper may be provided by a shield 26 that travels with the arm 12, and having an aperture 27 of a size such as entirely to cut off the light of the source 1 except during those portions of the pendulum swings in which the speed of the pendulum 13 is substantially constant. By further refinements of any desired sort, the movement of the auxiliary mirror 11 may be caused to take place at constant speed, in contrast to sinusoidally varying speed, toward or away from the source 1. If this refinement is resorted to, the light valve or beam chopper may be dispensed with, and a more favorable duty cycle can be achieved.

Movement of the pendulum-driven mirror 11 away from the source, i.e., in the direction shown in the figure by the arrow 28, reduces the instantaneous frequency of the auxiliary beam 14 as compared with that of the source 1. In other words, the frequency shift introduced is a negative one, as indicated in Equation 3. This, in turn, after intermodulation of the components by the photomultiplier, makes for an intermediate frequency $s$ of positive sign, as indicated in Equation 5. However, an alteration of the sign of the frequency shift $s$, provided its absolute magnitude is substantially greater than any magnitude attainable by the modulation $\Delta$, means only an inversion of the phase of the intermediate frequency subcarrier. Since the discriminator 23 is not sensitive to the phase of the subcarrier, this is of no importance. Consequently, forward swings of the pendulum 13 toward the light source 1 serve as well as do backward swings away from the light source, it being necessary only that the speed of the pendulum-driven mirror 11, as utilized, be always greater than the speed of movement of the modulating mirror 6.

Figure 2:
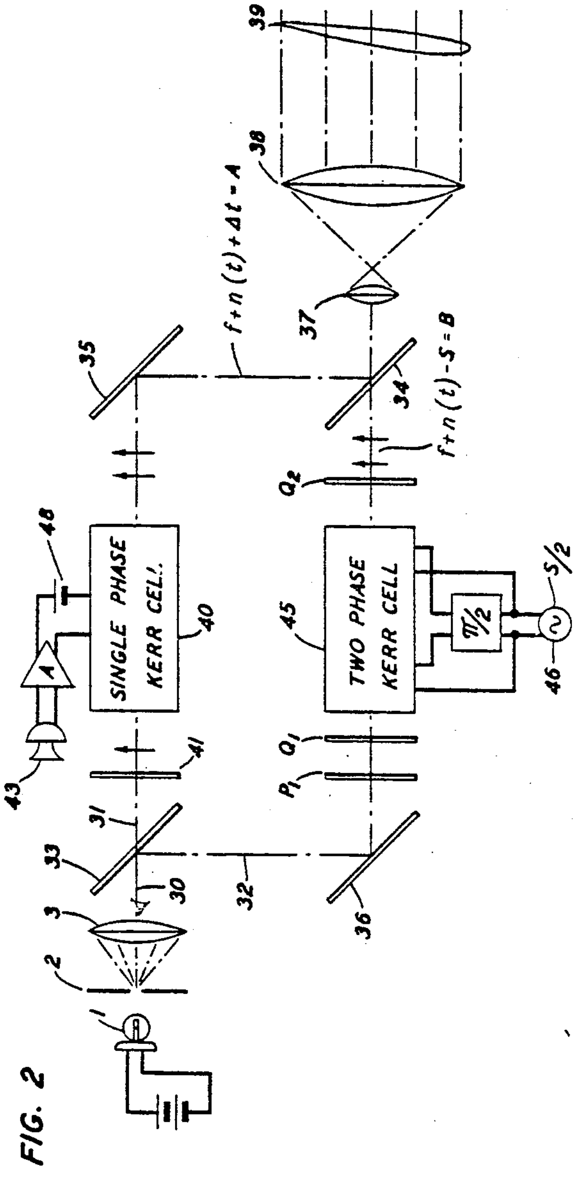
FIG. 2 is a schematic energy path diagram showing an alternative to the transmitter portion of the system of FIG. 1.

FIG. 2 shows a variant of the transmitter apparatus of the invention in which frequency modulation is imparted to the principal beam, and a frequency shift is imposed on the auxiliary beam, by turning the Kerr effect to account. The original light source 1, the collimator, including the shield 2 with its pinhole and the lens 3, may be the same as the corresponding components of FIG. 1. The collimated light beam 30 is split into two component beams 31, 32 by a semitransparent mirror 33 and the principal beam 31, shown horizontally in the figure, is brought to a recombining element, e.g., a second semitransparent mirror 34, by a wholly reflecting mirror 35 while the auxiliary beam 32, shown vertically in the figure, is brought to the same recombining element 34 by another wholly reflecting mirror 36. Provision is made for the frequency-modulation of the principal beam 31 in its first pass and provision is made for the frequency shift of the auxiliary beam 32 in its second pass. In each case, however, it is of no importance whether the modulation or the shift or both take place before reflection of the beam to the recombining element 34 or after such reflection. As in the case of FIG. 1, however, it is desirable that the path lengths of the two beams 31, 32 from the light source 1 to the recombining element 34 be alike.

After recombination by the mirror 34, the principal and auxiliary beams are radiated toward a receiver station, preferably after being directed through a telescope 37, 38, to increase its aperture and so reduce its angular spread.

Figure 4:
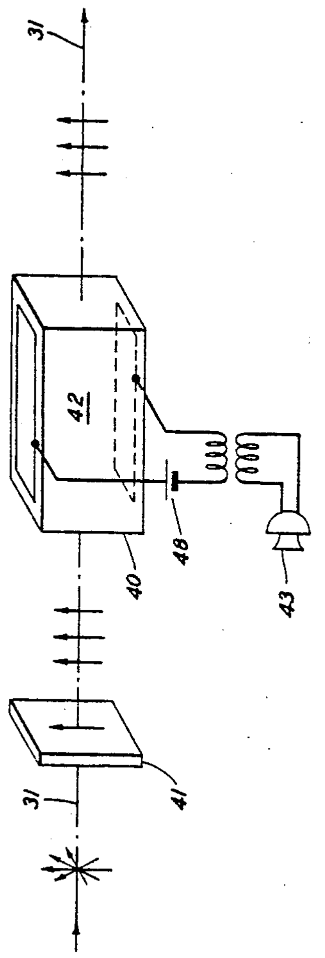
FIG. 4 is a perspective diagram of the frequency modulator of FIG. 2.

It is well known that a light valve, i.e., an amplitude modulator for light rays, may consist of a conventional Kerr cell preceded by a polarizer, of which the axis is disposed at 45° to the direction of vibration of the extraordinary ray, and followed by an analyzer that is appropriately oriented. In accordance with one feature of the present invention, frequency modulations are imparted to the principal beam 31 by a conventional Kerr cell 40 preceded by a polarizer 41 of which the transmission axis is parallel with the direction of vibration of the extraordinary ray in the Kerr cell 40 so that it blocks the ordinary ray. The light originating in the source 1 and randomly polarized, is converted into plane-polarized light by the polarizer 41 which may conveniently take the form of a sheet of light-polarizing material such as that known by the trade name "Polaroid." This plane-polarized light, vibrating in an invariant plane here shown as vertical, passes through the Kerr cell 40, shown in perspective in FIG. 4. This Kerr cell contains a medium 42, such as nitrobenzene, which is rendered controllably birefringent by a message-wave-controlled electrostatic field to which it is subjected, by application of a potential difference between electrodes located above and below it, so that the electrostatic field is vertical in the medium of the Kerr cell. To ensure that the electrostatic field shall change, with the message wave, only in magnitude and not in polarity, a source 48 of a bias potential is connected in series. When thus energized, the incident light, vibrating only parallel with the electrostatic field, and hence becoming the extraordinary ray in the Kerr cell, is retarded by the cell in proportion to the magnitude of the applied potential difference and to the length of its path through the Kerr medium. Such a retardation is without limit, in principle, and is limited, in practice, only by the dielectric strength of the Kerr medium and by its opacity. This retardation appears in the emergent vertically polarized beam as a message-wave-controlled phase shift, which is similarly unlimited in principle. As before, the integral of the phase shift is the frequency modulation. Thus, variations of the message wave delivered, for example, into a telephone transmitter 43 produces variations in the phase retardation, and hence in the frequency, of the emergent, vertically polarized, principal beam at the recombination point 34.

Similar principles are employed to introduce a frequency shift into the auxiliary beam 32. The frequency shifter may comprise a modified Kerr cell in combination with a polarizer $P_1$ and a first quarter wave plate $Q_1$ preceding it and a second quarter wave plate $Q_2$ following it. The polarizer $P_1$ may again be a sheet of "Polaroid," and acts to convert incident randomly polarized light into plane-polarized light. The first quarter wave plate $Q_1$ is a crystalline birefringent element of known type and of suitable thickness which, when its principal axis is disposed at 45° to the principal axis of the polarizer $P_1$, converts incident plane-polarized light into circularly polarized light. The Kerr cell 45, so modified in the fashion to be described below as to behave like a rotating half-wave element, converts light that is circularly polarized in the clockwise (or counterclockwise) sense into emergent light that is circularly polarized in the opposite sense and with a polarization rotation speed that depends on the frequency of an auxiliary source 46. The second quarter wave plate $Q_2$, which may be identical in construction with the first quarter wave plate $Q_1$, operates to reconvert the emergent circularly polarized light into plane-polarized light of which, however, the frequency has been shifted by twice the frequency of the auxiliary source 46.

Figure 5:
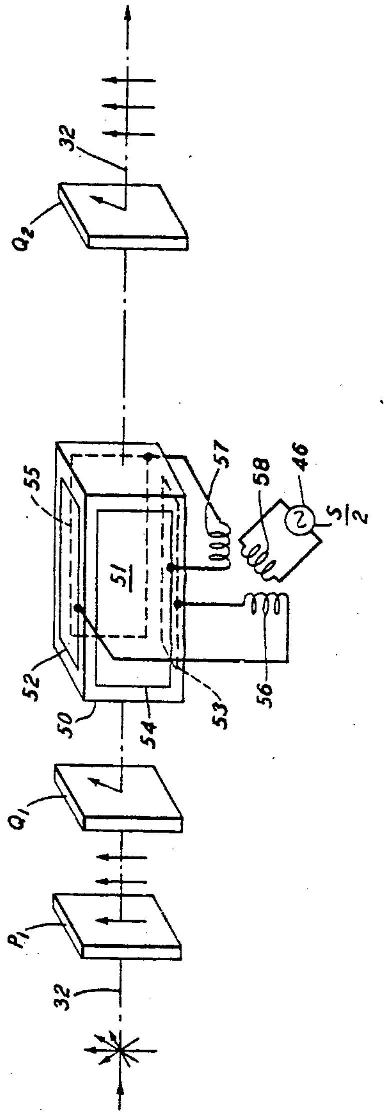
FIG. 5 is a perspective view of the frequency shifter of FIG. 2.

The frequency shifter is shown in greater detail, and along with the polarizer $P_1$ and the two quarter wave plates $Q_1$, $Q_2$ in FIG. 5. It comprises a vessel 50 filled with a suitably transparent, controllably birefringent medium 51 which may be the same as the medium utilized in the frequency-modulating Kerr cell 40. In contrast to the latter, the vessel 50 is provided with more than two, e.g., two pairs of electrodes, the members 52, 53 of one pair being disposed above it and below it, and the members 54, 55 of the other pair being disposed on either side of it. The two pairs of electrodes are energized, in accordance with this aspect of the invention, by voltages of like magnitude and in time-quadrature at a frequency $s/2$. This quadrature energization is indicated in the drawing as being secured through a transformer having two secondary windings 56, 57, of which the axes are disposed at 90° to each other and connected respectively to the vertically disposed electrode pair 52, 53 and to the horizontally disposed electrode pair 54, 55, and a common primary winding 58, disposed at 45° to each of the secondary windings 56, 57 and connected to a source 46 of oscillations of frequency $s/2$. With this arrangement, the electrostatic field applied to the medium 51 remains of constant strength but rotates in a plane perpendicular to the path of the auxiliary ray 32 through the medium 51 at $s/2$ revolutions per second. When the strength of the electrostatic field is coordinated with the axial length of the vessel 50 to introduce a relative retardation between the extraordinary ray and the ordinary ray of 180°, the cell causes the emergent circularly polarized light to rotate, in the sense opposite to the sense of rotation of the incident circularly polarized light and at a rate differing from the rate of rotation of the incident light by twice the source frequency $s/2$. Alternative arrangements may be employed, e.g., three electrodes angularly spaced apart by 120°, and energized by three-phase voltage.

The second quarter wave plate $Q_2$ reconverts the emergent circularly polarized light into plane-polarized light of which, however, the frequency has been shifted, either upward or downward from the frequency of the original light source, by the amount $s$.

The polarization plane of the emergent light depends solely on the orientation of the second quarter wave plate $Q_2$, and may most conveniently be controlled by rotation of the latter about the path of the auxiliary ray 32 advantageously until the auxiliary beam 32 is polarized in the same plane as the principal beam 31. The composite beam now consists of two components whose mean frequencies differ by the shift $s$, one being modulated by the passage wave and the other unmodulated, both beams being of plane-polarized light, and the planes of polarization being alike.

The operation of the optical frequency shifter described above is in many ways similar to that of a microwave frequency shifter, of widely different construction and suitable for operation at widely different wavelengths, which is the subject of a monograph by A. Gardner Fox, published in the Proceedings of The Institute of Radio Engineers for December 1947, vol. 35, page 1489.

Figure 3:
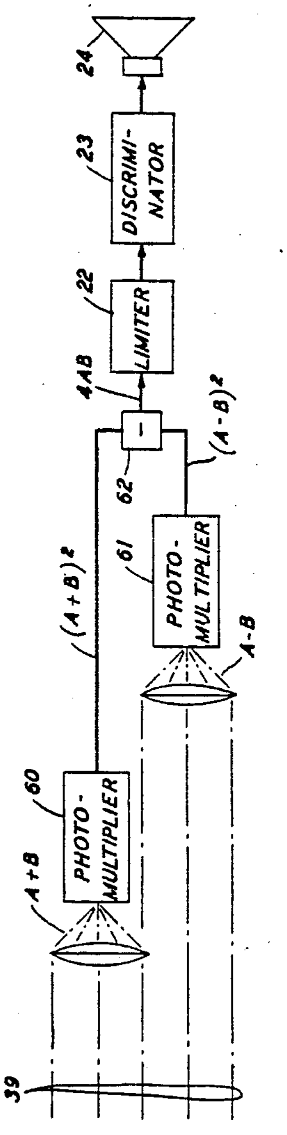
FIG. 3 is a schematic energy path diagram showing an alternative to the receiver portion of FIG. 1.

As in the case of the Doppler effect shifter of FIG. 1, the auxiliary source 46 should be so proportioned that the ultimate frequency shift of the auxiliary beam 32 shall at least exceed the highest component frequency of the message wave modulation of the principal beam 31. For reasons which will become evident when the particular receiver of FIG. 3 is discussed, the frequency shift is advantageously many times as high as the highest component modulating frequency.

The Kerr effect frequency shifter of FIG. 5 operates continuously and steadily, and hence the duty cycle of the system may be 100% and without any phase inversion of the subcarrier frequency $s$.

The composite beam, after radiation may, if desired, be applied to the receiver apparatus of FIG. 1, its two components being intermodulated to develop a difference-frequency modulation product, of mean frequency $s$, carrying message frequency modulations $\Delta(t)$. Incidental amplitude modulations may be removed, as before, by a limiter, and a discriminator may be employed to recover the message wave in a form suitable for application to a reproducer.

The intermodulation, in the fashion of FIG. 1, of complex components of different frequencies gives rise to numbers of different modulation products of which only one is useful. The others may, in some cases, give rise to noise in the output. It is therefore of advantage, when possible, to generate undesired modulation products in the fewest possible numbers and to utilize, when possible, a multiplier in contrast to a modulator. The fact that the two component beams are plane-polarized in the same polarization plane renders it possible to do so in the fashion described below.

Referring to FIG. 3, when two beams or rays of similarly plane-polarized light and of slightly different frequencies are transmitted along the same path as in the case of FIG. 2, interference takes place between them so that, at certain distances along the path, they are in phase coincidence, giving rise to intensity maxima while, at other distances along the path they are in phase opposition, giving rise to intensity minima. In other words, at the maximum points, they are in additive relation while at the minimum points they are in subtractive relation. Designating the intensity of either beam by A and the intensity of the other beam by B, a receptor located at a maximum point receives the sum $A+B$ while another receptor located at a minimum point receives the difference $A-B$. A photomultiplier 60 located to receive the sum, $A+B$, and having a square law characteristic delivers an output proportional to $(A+B)^2$, while a second similar photomultiplier 61 located to receive the difference delivers an output proportional to $(A-B)^2$. The principle of the quarter square multiplier, which is the subject of C. A. Lovell Patent 2,906,459, September 29, 1959, may now be turned to account by applying the outputs of the two photomultipliers 60, 61 to the two input points of a subtractor 62 which delivers, at its output point, a signal that is proportional to the product AB. In addition to the desired term $s=\Delta(t)$, the only undesired term which appears in this product is the double frequency term; a term whose mean frequency is approximately twice that of the light of the original source 1. Signal variations of such a high frequency, of course, cannot pass through electric circuits. Accordingly, since all undesired modulation products of frequency $2s$, $2\Delta$, etc., have been eliminated by employment of the quarter square multiplier principle, noise which might otherwise appear in the output is greatly reduced.

As before, spurious or incidental variations of amplitude are removed by passing the desired component of the output of the subtractor 62, namely, the component whose mean frequency is $s$, carrying message-determined frequency modulations $\Delta(t)$, through a limiter 22 to purify the message-determined frequency modulations. The purified wave is then converted, by a discriminator 23 as before, into amplitude modulations suitable for application to a reproducer 24.

What is claimed is:

1. A communication system which comprises a source of a beam of light, means for splitting said beam into two component beams whereby any fluctuations of the light of said source are identically reproduced in said two component beams, a source of a band-limited message wave, means for modulating the frequency of the first of said beams by said message wave, means for shifting the frequency of the second of said beams by a fixed amount in excess of the message wave band limit, means for recombining said frequency-shifted beam with said frequency-modulated beam to form a composite beam, means for transmitting said composite beam to a receiver station and, at said receiver station, means for developing from the components of said composite beam a message-modulated subcarrier of which the center frequency is equal to said frequency-shift and the frequency modulations are representative of said message wave, and discriminator means for recovering the message wave from said subcarrier.

2. A communication system which comprises a source of a beam of light, means for splitting said beam into two component beams whereby any fluctuations of the light of said source are identically reproduced in said two component beams, a source of a band-limited message wave, means for modulating the frequency of the first of said component beams by said message wave, means for shifting the frequency of the second of said component beams by a fixed amount $s$ in excess of the message wave band limit, and means for recombining said frequency-shifted beam with said frequency-modulated beam to form a composite beam having two distinguishable components of different mean frequencies, of which one is fixed while the other is modulated by said message wave, whereby said components, after reception, can be intermodulated to develop a subcarrier wave of frequency $s$ that is frequency-modulated by the message wave.

3. Apparatus as defined in claim 2 wherein the optical paths followed by the principal and auxiliary beams from said beam-splitting means to said recombining means are of equal mean lengths.

4. Apparatus as defined in claim 2 wherein the frequency-modulating means comprises means for varying the path length of said principal beam, between said beam-splitting means and said recombining means, under control of said message wave.

5. Apparatus as defined in claim 2 wherein the frequency-shifting means comprises means for varying the path length of said auxiliary beam, between said beam-splitting means and said recombining means, at a preassigned constant rate.

6. Apparatus as defined in claim 2 wherein the frequency-modulating means comprises a mirror disposed in a plane substantially normal to the direction of said principal beam, and means for vibrating said mirror perpendicularly to its own plane in conformance with said message wave.

7. Apparatus as defined in claim 2 wherein the frequency-shifting means comprises a mirror disposed in a plane substantially normal to the direction of said auxiliary beam, and means for moving said mirror perpendicularly to its own plane at a preassigned contant speed.

8. Apparatus as defined in claim 2 wherein the frequency-modulating means comprises means disposed in the path of said principal beam for plane-polarizing its light to vibrate in a preassigned plane, a controllably birefringent medium, means including a potential source and a pair of electrodes disposed on opposite sides of said medium for orienting the plane of vibration of an extraordinary ray in said medium parallel with said polarization plane, and a source of message wave potential variations coupled to said electrodes for varying retardation of said extraordinary ray through said medium.

9. Apparatus as defined in clam 2 wherein the frequency-modulating means comprises means disposed in the path of said principal beam for plane-polarizing its light to vibrate in a preassigned plane, a controllably birefringent medium, means including a potential source for applying to said medium an electrostatic field in a direction parallel to said preassigned plane, and a source of a message wave for varying the strength of said field.

10. Apparatus as defined in claim 2 wherein the frequency shifting means comprises a polarizer for the light of said source, a first quarter wave element, for converting from linear to circular polarization, a controllably birefringent medium and a second quarter wave element for converting from circular to linear polarization disposed in tandem in the order named in the path of the auxiliary beam, means including a source of oscillations of a preassigned fixed frequency $s/2$ for establishing, in said medium, an electrostatic field of preassigned constant strength and for causing said field to revolve about the axis of said auxiliary beam at said frequency $s/2$, the optical path length for said beam in said medium being coordinated with said constant field strength to cause a relative retardation of 180° between the emergent ordinary ray and the emergent extraordinary ray, whereby light incident on said medium from said first quarter wave element, of which the polarization rotates at the frequency $f$ of the light source, emerges from said medium with polarization that rotates at a frequency $f \pm s$, and whereby said emergent circularly polarized light is reconverted by said second quarter wave plate to plane polarized light of frequency $f \pm s$.

11. Apparatus for shifting by an amount $s$, the frequency $f$ of a beam of plane polarized light which comprises a first quarter wave plate, for converting from linear to circular polarization, a controllably birefringent medium and a second quarter wave plate for converting from circular to linear polarization disposed in tandem in the order named in the path of the auxiliary beam, at least two pairs of electrodes symmetrically disposed around said medium, a source of oscillations of a preassigned fixed frequency $s/2$, means for energizing oppositely disposed members of the several electrode pairs in time sequence by the oscillations of said source, thereby to establish, in said medium, an electrostatic field of preassigned constant strength and to cause said field to revolve at said frequency $s/2$, the optical path length for said beam in said medium being coordinated with said constant field strength to cause a relative retardation of 180° between the emergent ordinary ray and the emergent extraordinary ray, whereby light incident on said medium from said first quarter wave plate, of which the polarization rotates at the frequency $f$ of the light source, emerges from said medium with polarization that rotates at a frequency $f \pm s$, and whereby said emergent circularly polarized light is reconverted by said second quarter wave plate to plane polarized light of frequency $f \pm s$.

12. Apparatus for shifting by an amount $s$, the frequency of a beam of plane polarized light which comprises a first quarter wave plate, for converting from linear to circular polarization, a controllably birefringent medium and a second quarter wave plate for converting from circular to linear polarization disposed in tandem in the order named in the path of the auxiliary beam, means including a source of oscillations of a preassigned fixed frequency $s/2$ for establishing, in said medium, an electrostatic field of preassigned constant strength and for causing said field to revolve at said frequency $s/2$, the optical path length for said beam in said medium being coordinated with said constant field strength to cause a relative retardation of 180° between the emergent ordinary ray and the emergent extraordinary ray, whereby light incident on said medium from said first quarter wave plate, of which the polarization rotates at the frequency $f$ of the light source, emerges from said medium with polarization that rotates at a frequency $f \pm s$, and whereby said emergent circularly polarized light is reconverted by said second quarter wave plate to plane polarized light of frequency $f \pm s$.

13. Apparatus for recoverng a message wave from a principal component beam of light of a first frequency, originating in a light source and plane polarized to vibrate in a preassigned plane, and onto which beam said message wave has been frequency-modulated, with the aid of an auxiliary component unmodulated beam of light of a second frequency, originating in the same source and polarized in the same plane, said two component beams reaching said recovering apparatus as a composite beam, whereby a stationary axial interference pattern is manifested in said composite beam between its components, which comprises a first photomultiplier having a square law characteristic disposed in the path of said composite beam at a point, removed from said source by a first distance, where the phases of said components of said axial interference pattern are additive, a second photomultiplier having a square law characteristic disposed in the path of said composite beam at a point, removed from said source by a different distance, where the phases of said components of said axial interference pattern are substractive, means for subtracting the output of one photomultiplier from the output of the other photomultiplier to develop a product wave, and a discriminator for converting said product wave into a reproducible message wave.

14. A communication system which comprises a source of a beam of light, means for splitting said beam into two component beams whereby any fluctuations of the light of said source are identically reproduced in said two component beams, a source of a band-limited message wave, means for modulating the frequency of the first of said component beams by said message wave, means for shifting the frequency of the second of said component beams by a fixed amount in excess of the message wave band limit, means for recombining said frequency-shifted component beam with said frequency-modulated component beam to form a composite beam, a transmission medium, means for transmitting said composite beam over said medium to a receiver station, whereby a stationary axial interference pattern is established in said medium between the two constituents of said composite beam and, at said receiver station, means for recovering said message wave from said composite beam which comprises a first photomultiplier having a square law characteristic disposed in the path of said composite beam at a point, removed from said source by a first distance, where the phases of said constituents are additive, a second photomultiplier having a square law characteristic disposed in the path of said composite beam at a point, removed from said source by a different distance, where the phases of said constituents are subtractive, means for subtracting the output of one photomultiplier from the output of the other photomultiplier to develop a product wave, and a discriminator for converting said product wave into a reproducible message wave.

15. A communication system which comprises a source of a beam of light, a source of a message wave of substantial, though limited, frequency band, means for modulating the light of said beam by said message wave, means for transmitting said modulated beam to a receiver station and, at said receiver station, a plurality of non-linear photoelectric elements having a square law characteristic relating an optical input to an electrical output and being distributed along the incident light path, means for developing from the original beam an auxiliary unmodulated beam of light of a frequency differing from that of the original beam by a steady offset $s$, greater than any message frequency, means for directing said modulated beam and said auxiliary beam together onto said elements, said distribution of elements being arranged to correspond to the axial interference pattern of said modulated and auxiliary light beams, said modulated and auxiliary beams together developing, in the output of said elements, a current of frequency $s$ that is modulated conformably with said message wave, and means for recovering said message wave from said modulated current.

16. A communication system which comprises a source of a beam of light, a source of a message wave of substantial, though limited, frequency band, means for modulating the light of said beam by said message wave, means for transmitting said modulated beam to a receiver station and, at said receiver station, a plurality of non-linear photoelectric elements having a square law characteristic relating an optical input to an electrical output, means for developing an auxiliary unmodulated beam of light of a frequency differing from that of the original beam by a steady offset $s$, greater than any message frequency, means for directing said modulated beam and said auxiliary beam together onto said elements, said elements being longitudinally displaced along the incident light path to optimally detect the axial pattern of interference of said modulated and auxiliary beams of light, said modulated and auxiliary beams developing in the output of said elements, a current of frequency $s$ that is modulated conformably with said message wave, and means for recovering said message wave from said modulated current.

17. A communication system which comprises a source of a beam of light, a source of a message wave of substantial, though limited, frequency band, means for modulating the frequency of the light of said beam by said message wave, means for transmitting said frequency-modulated beam to a receiver station and, at said receiver station, a plurality of non-linear photoelectric elements having a square law characteristic relating an optical input to an electrical output, means for developing an auxiliary unmodulated beam of light of a frequency differing from that of the original beam by a steady offset $s$, greater than any message frequency, means for directing said frequency-modulated beam and said auxiliary beam together to produce an axial interference pattern of varying intensity, said elements being disposed along said light path at distances equal to the separation between the points of maximum and minimum intensity of said interference pattern, said modulated and auxiliary beams developing in the output of said elements a current of frequency $s$ that is frequency-modulated conformably with said message wave, a discriminator, and connections for applying said developed current to said discriminator, thereby to recover said message wave.

References Cited by the Examiner

UNITED STATES PATENTS

| | | | |
|---|---|---|---|
| 1,834,117 | 12/31 | Wright | 88—61 |
| 1,885,604 | 11/32 | Karolus | 88—61 |
| 2,265,784 | 12/41 | Von Baeyer | 250—199 |
| 2,385,086 | 9/45 | D'Agostino et al. | 250—199 |
| 2,531,951 | 11/50 | Shamos et al. | 250—199 |
| 2,745,316 | 5/56 | Sziklai | 88—61 |

FOREIGN PATENTS

| | | |
|---|---|---|
| 776,129 | 6/57 | Great Britain. |
| 122,552 | 2/58 | Russia. |

OTHER REFERENCES

Wood, Physical Optics, MacMillan Co., 1929, page 296.

DAVID G. REDINBAUGH, *Primary Examiner.*